(12) United States Patent
Patil et al.

(10) Patent No.: US 6,541,586 B2
(45) Date of Patent: Apr. 1, 2003

(54) POLYMERIZATION PROCESSES FOR USING DILUTE MULTICOMPONENT FEEDS (LAW624)

(75) Inventors: Abhimanyu O. Patil, Westfield, NJ (US); Donald N. Schulz, Annandale, NJ (US); Raymond A. Cook, Hampton, NJ (US); Michael G. Matturro, Lambertville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/233,353

(22) Filed: Jan. 19, 1999

(65) Prior Publication Data

US 2002/0156213 A1 Oct. 24, 2002

(51) Int. Cl.[7] .................................................. C08F 4/34
(52) U.S. Cl. .................... 526/230; 526/230.5; 526/232; 526/232.1; 526/348; 526/285
(58) Field of Search ................................. 526/330, 348, 526/230.5, 232, 232.1, 285

(56) References Cited

U.S. PATENT DOCUMENTS

| | | | | |
|---|---|---|---|---|
| 4,024,325 A | | 5/1977 | Hudgin ....................... 526/11.1 |
| 4,024,326 A | * | 5/1977 | Hudgin et al. .............. 526/230 |
| 5,164,454 A | * | 11/1992 | Suga et al. .................. 525/309 |
| 5,719,258 A | | 2/1998 | Drent |

FOREIGN PATENT DOCUMENTS

| WO | WO 96/22266 | 7/1996 |
|---|---|---|

OTHER PUBLICATIONS

The Textbook of Polymer Science, 3rd Edition (edited by Fred W. Billmeyer, A Wiley–Interscience Publication, John Wiley and Sons, New York, 1984, p. 362–363).*

* cited by examiner

*Primary Examiner*—David W Wu
*Assistant Examiner*—William Cheung
(74) *Attorney, Agent, or Firm*—Gerard J. Hughes; Joseph C. Wang

(57) ABSTRACT

The invention relates to a method of forming carbon monoxide-containing polymers from multi-component syngas feeds and at least one vinyl comonomer. Feeds useful in the practice of the invention comprise ethylene in an amount ranging from about 5 to about 40 mole %, carbon monoxide is an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include acetylene in an amount ranging up to about 10 mole %. The feed may contain at least one free radical-polymerizable vinyl comonomer, or a cofeed containing such a comonomer can be used.

4 Claims, No Drawings

POLYMERIZATION PROCESSES FOR USING DILUTE MULTICOMPONENT FEEDS (LAW624)

FIELD OF THE INVENTION

The invention is directed towards a polymerization process for making copolymers from feeds of ethylene, carbon monoxide, and at least one vinyl co-monomer, the feeds preferably being derived from hydrocarbon conversion processes.

BACKGROUND OF THE INVENTION

Ethylene copolymers with CO, and another vinyl comonomer are prepared at high pressure, high temperature from high purity monomer streams, especially streams having a low hydrogen concentration.

Multicomponent syngas-type feeds, containing ethylene, carbon monoxide, hydrogen, carbon dioxide, and methane are formed from various gas conversion processes, and are becoming increasingly abundant. Using such feeds for polymerization would be beneficial. However, such feeds are not considered to have sufficient purity for polymerization because they contain substantial amounts of reactive species such as hydrogen and acetylene.

There is therefore a need for a process for forming carbon monoxide containing copolymers from multicomponent feeds.

SUMMARY OF THE INVENTION

The invention is a method for polymerizing ethylene-carbon monoxide with at least one vinyl monomer (X). Such polymers may be designated E/CO/X. The method comprises forming copolymers under copolymerization conditions from a feed of ethylene, carbon monoxide, hydrogen, carbon dioxide, methane, and at least one vinyl comonomer selected from the group consisting of free radical polymerizable vinyl monomers.

More specifically, the feed contains ethylene in an amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include acetylene in an amount ranging up to about 10 mole %.

Polymerization conditions range in temperature from about 50 to about 230° C., range in pressure from about 100 to about 30,000 psi, and include a radical initiator having an appropriate half-life.

DETAILED DESCRIPTION OF THE INVENTION

The invention is based on the discovery that ethylene-carbon monoxide polymerization processes using multicomponent syngas feeds facilitate copolymerization with other vinyl monomers. For example, ethylene and octene are difficult to copolymerize under free radical polymerization conditions. The reactivity ratio for ethylene is 3.1 and the reactiviy ratio for others is 8. Consequently, both ethylene and octene would rather homopolymerize than copolymerize. However, when MCS is used as a source of ethylene, incorporation of at least one vinyl comonomer is enabled.

Without wishing to be bound by any theory, it is believed the ECO radical is more reactive than an ethylene or octene radical would be toward ethylene or octene. Moreover, RCO radicals cannot add CO. Thus incorporation of octene is facilitated within excluded sequences of CO. Moreover, it is believed that the hydrogen present in such feeds beneficially acts as a mild chain transfer agent.

Feeds useful in the practice of the invention comprise at least one olefinically unsaturated compound in an amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, and methane in an amount ranging from about 4 to about 85 mole %. The feed may also include at least one acetylenically unsaturated compound in an amount ranging up to about 10 mole %. The feed may contain at least one free radical-polymerizable vinyl comonomer, or a cofeed containing such a comonomer can be used. Vinyl monomers useful in the invention include ethylene, α-olefins ($C_3$ to $C_{30}$) such as propylene, butene, 1-octene, 1-octadecene, styrene and styrene derivatives such as α-methylstyrene, p-methylstyrene, tetrafluoroethylene, vinyl chloride, vinyl acetate, isobutyl vinyl ether, methyl vinyl ketone, 1-vinylpyrrolidone, acrylic acid, methacrylic acid, methylacrylate, methylmethacrylate, acrylonitrile, acrylamide, acrolein, allyl alcohol, allyl chloride, allyl acetate, mixtures thereof, and similar materials. While vinyl comonomer concentration in the feed may range from zero or trace amounts to about 95 mole %, the preferred concentration ranges from about 5 mole % to 80 mole %.

The olefinically unsaturated compounds (i.e., olefins) useful in the invention typically contain up to 20 carbon atoms, preferably up to 10 carbon atoms. They may contain heteroatoms; however, it is preferred that the olefinically unsaturated compounds are hydrocarbons. A preferred class of olefinically unsaturated hydrocarbons are aliphatic mono-olefins, in particular α-olefins of which ethylene is particularly preferred.

The acetylenically unsaturated compounds useful in this invention preferably contain up to 20 carbon atoms, more preferably up to 10 carbon atoms. Preferably they are hydrocarbyl compounds, and they may vary widely in structure. They may also contain heteroatoms. Preferably, the acetylenically unsaturated compounds have at most one organic group attached to the ethynyl groups. More preferably the acetylenically unsaturated compound is of the general formula R—C≡CH where R denotes a hydrogen atom or a hydrocarbyl group. Hydrocarbyl groups R may be aryl groups, such as phenyl, 4-methoxyphenyl, 3-chlorophenyl and naphthyl groups, or (cyclo)alkyl groups, such as methyl, ethyl, 2-propyl, 2-butyl, cyclohexyl and 2-methylhexyl-1 groups. For example, when the R group is a methyl groupthen the acetylenically unsaturated compound is propyne, and when the R group is hydrogen then the acetylenically unsaturated compound is acetylene. A mixture of acetylenically unsaturated compounds may be involved, but a single acetylenically unsaturated compound is preferred.

Feeds used in the practice of the invention contain a combined CO and olefin concentration of no more than about 35 mole %. The preferred feed is derived from hydrocarbon, preferably from gas conversion processes, and still more preferably from natural gas conversion processes. Oxidative coupling and methane partial oxidation of a methane-containing gas followed by ethane quench are examples of such a reaction. A mixture of feeds resulting from such processes is also within the scope of the invention. In addition to carbon dioxide, inert diluents such as methane can be present in the feed in amounts ranging from about 4 mole % to about 85 mole %. Importantly, feeds used in the practice of the invention may contain up to 55 mole % $H_2$. The preferred feed contains 5 to 55 mole % hydrogen, and is formed in a methane-derived hydrocarbon synthesis reaction. The methane-containing gas may be a natural gas or a synthetic gas.

CO-containing polymers of the present invention are formed in free radical polymerization processes using, organic peroxides as a free radical initiator according to conventional methods. Representative initiators include dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl proxides such as benzoyl peroxide; peroxy esters such as tertiary-butyl peroxypivalate, tertiary-butyl-perbenzoate; and compounds such as azo-bis-isobutyronitrile. Free radical initiators with an appropriate half-life at a reaction temperature ranging from about 50° C. to about 200° C. can be used, and of these, t-butyl peroxypivalate, which has a half life of about 10 hours at 66° C., is preferred.

Such feeds and initiators are useful for forming CO-containing polymers under copolymerization conditions at temperatures ranging from about 50 to about 230° C., preferably from about 50° C. to about 100° C., pressures ranging from about 100 to about 30,000 psi, preferably from about 100 psi to about 3,000 psi, and in the presence of a free radical initiator having an appropriate half life.

Preferably, the reaction occurs in the presence of a solvent. Suitable solvents include toluene, benzene, dioxane, pentane, heptane, hexane, propylene oxide, cyclohexane, and the like. Hexane is preferred.

The term "polymer" as used herein is a macromolecule formed from at least one monomer or monomer source; the term "copolymer" is a macromolecule formed from at least two monomers or monomer sources.

The copolymers and polymers prepared in accord with this invention may be recovered from the polymerization of mixture using conventional methods, for example, by filtration or by evaporation of the diluent. They may be brought into the desired shape by the usual forming techniques, such as cold or hot pressing. Alternatively, the polymerization is carried out in such a way that the copolymer is formed in the desired shape, such as by solution polymerization in a thin layer and subsequent removal of the diluent, which yields the copolymer in the form of a film.

The number average molecular weight ("Mn") of the polymers formed in accordance with the invention range from about 200 to about 1,000,000. Mn preferably ranges from 300 to 100,000 and more preferably from 500 to 50,000.

The degree of branchiness of the copolymer chains and the number of monomer units originating in the monomers with polymerizable carbon-carbon unsaturation relative to the number of carbon atoms originating in carbon monoxide will both, at least in part, determine the regularity of the polymer chains and thereby also some of the properties of the copolymer, for example the crystallinity and solubility. The ratio of the number of monomer units originating in the olefinically unsaturated compound and, if present, the acetylinically unsaturated compound to the number of carbon atoms originating in carbon monoxide is preferably at most about 99:1, more preferably in the range of from about 90:1 to about 1:1, and still more preferably from about 95:1 to about 1:1. However, where the presence of additional cure sites are desired or beneficial, the preferred range of acetylene incorporation should be less than 10%.

The polymers prepared according to the practice of the invention are non-linear polymers having a total number of branches per 1000 carbon atoms ranging from about 60 to about 300. Branchiness is measured by $^{13}C$ solution NMR in deutero chloroform using a $Cr(AcAc)_3$ relaxation agent. The number of $C_1$ branches per 1000 carbon atoms was measured at about 20.1 ppm; the number Of $C_2$ branches, per 1000 carbon atoms was measured at about 11.3 ppm; the number of $C_3$ was measured at about 14.7 ppm; and the number of $C_4$ branches was measured at about 14.2 ppm.

The polymers prepared in accord with this invention are paraffin-soluble. The term "paraffin" as used herein is a normal, iso, or straight chain alkane.

The invention is further described in the following non-limiting examples.

EXAMPLE 1

A 300 ml autoclave was charged with 150 ml pure n-hexane and 0.609 grams of a 75% solution of t-butyl peroxypivalate in mineral spirits. The reactor was sealed and purged with purified nitrogen. The reactor was initially spiked with ethylene by pressurizing to 170 psig and subsequently pressurizing with multicomponent syngas (MCS) mixture (ethylene 5.4%, carbon monoxide 1.3%, carbon dioxide 7.4%, hydrogen 4.6% and methane 81.3%) to 500 psig. In all examples, relative component concentrations are in mole %, unless otherwise noted. The temperature was raised to 66° C. while stirring and the autoclave was pressurized with MCS feed to 700 psi, which was maintained for 24 hours. The reactor was allowed to cool to room temperature and was then depressurized. The hexane was removed on rotary evaporator to obtained 2.58 g the product.

The product was characterized by IR and GPC. The FTIR spectrum of the product showed a very strong peak at 1718 $cm^{-1}$ due to carbonyl group, indicating incorporation of carbon monoxide in the product. The GPC of the product (polystyrene standards, THF solvent) showed the Mn of 406 and Mw of 845.

This example shows that an ethylene feed and a relatively dilute MCS feed are useful polymerization co-feeds.

EXAMPLE 2

In this example, the polymerization reaction described in Example 1 was repeated with a higher level of ethylene spiking, 412 psig initial reactor pressurization compared to 170 psig reactor pressurization in example 1, in order to gauge the effect of ethylene concentration on product molecular weight.

The product was characterized by IR and GPC. The FTIR spectrum of the product showed a very strong peak at 1718 cm$^{-1}$ due to carbonyl group, indicating incorporation of carbon monoxide in the product. The GPC of the product (polystyrene standards, THF solvent) showed the Mn of 1000 and Mw of 2550.

The higher product molecular weight relative to the molecular weight of the product of example 1 shows that ethylene spiking level is an effective method for molecular weight control.

EXAMPLE 3–7

Carbon monoxide containing polymers was synthesized using an MCS with a vinyl acetate cofeed using free-radical polymerization. These examples show that ethylene-carbon monoxide copolymers can be formed with a vinyl comonomer and that molecular weight can be controlled. Polymerization reaction conditions were as follows:

Any inhibitor present with the vinyl acetate was removed by passing the vinyl acetate through an inhibitor removal column.

A 300 ml autoclave reactor was charged with solvent (n-hexane) and a t-butyl peroxypivalate initiator. Purified vinyl acetate was added with solvent in the autoclave (examples 3 and 6) or added into bomb with the MCS feed (examples 4,5 and 7). The reactor was sealed and purged with purified nitrogen. The reactor was pressurized to 275 psig with a relatively impure (or "dirty") MCS mixture (ethylene 9.2%, carbon monoxide 21.5%, carbon dioxide 3.0%, hydrogen 55.23%, acetylene 80.1%, and methane 3.06%). The temperature was raised to 66° C. while stirring, and the temperature was maintained for 24 hours, after which the reactor was allowed to cool to room temperature and was depressurized. The hexane was removed on rotary evaporator to obtain the product. Table-1 sets forth polymerization details.

MCS feed 2: Ethylene 9.2%, Carbon Monoxide 21.5%, Carbon Dioxide 3.0%, Hydrogen 55.23%, Acetylene 8.01%, and Methane 3.06%.

Table-2 sets forth characterization results for these polymers.

TABLE 2

| Example Number | NMR mole % Composition | GPC (Mn) | GPC (Mw) |
| --- | --- | --- | --- |
| 3 | E:26; VA:70; CO:4 | 1390 | 6180 |
| 4 | E:22; VA:76; CO:3 | 1770 | 7380 |
| 5 | E:32; VA:63; CO:5 | 1320 | 4360 |
| 6 | E:39; VA:55; CO:5 | 1070 | 3270 |
| 7 | E:56; VA:35; CO:9 | 730 | 1620 |

In example 4, NMR measurements revealed a double bond consistent with acetylene monomer incorporation and non-linear (branched) polyethylene segments.

EXAMPLE 8–10

Carbon monoxide-containing polymers using a relatively dilute MCS cofeed with styrene of 1-octene were synthesized using free-radical polymerization as follows:

An inihibitor removal column removed any inhibitor in the styrene.

The polymerization conditions were similar to those set forth in Example 1. A 300 ml autoclave was charged with solvent (n-hexane) and t-butyl peroxypivalate initiator. Purified monomer (styrene in examples 9 and 10 and octene in example 8) was added with solvent (example 8) in the autoclave or was added into bomb along with the MCS feed (examples 9 and 10). The reactor was sealed and purged with purified nitrogen. The reactor was pressurized to 700 psig with the MCS mixture. The temperature was raised to 66° C. while stirring, and was maintained for 24 hours. The reactor was allowed to cool to room temperature, and was then depressurized. The hexane was removed on a rotary evaporator to obtain the product. Table-3 sets forth the polymerization details.

TABLE 1

| Example Number | MCS Feed | Co-monomer Vinyl Acetate (ml) | Solvent Hexane (ml) | Temp. (° C.) | Initiator t-butyl peroxypivalate (g) | Yield (g) | Comments |
| --- | --- | --- | --- | --- | --- | --- | --- |
| 3 | 2 | 10 | 140 | 66 | 0.615 | 8.5 | Without bomb |
| 4 | 2 | 10 | 125 | 66 | 0.614 | 10.7 | VA added with MCS, with bomb |
| 5 | 2 | 5 | 125 | 66 | 0.618 | 6.7 | VA added with MCS, with bomb |
| 6 | 2 | 5 | 150 | 66 | 0.622 | 5.0 | Without bomb |
| 7 | 2 | 2 | 125 | 66 | 0.618 | 2.7 | VA added with MCS, with bomb |

TABLE 3

| Example Number | MCS Feed | Co-monomer | Solvent Hexane (ml) | Temp. (° C.) | Initiator t-butyl peroxypivalate (g) | Yield (g) | Comments |
|---|---|---|---|---|---|---|---|
| 8 | 1 | Octene 20 g | 150 | 66 | 0.630 | 2.9 | Without bomb |
| 9 | 1 | Styrene 5 g | 125 | 66 | 0.612 | 1.5 | Styrene added with MCS, with bomb |
| 10 | 1 | Styrene 1 g | 125 | 66 | 0.606 | 1.9 | Styrene added with MCS, with bomb |

MCS feed 1: Ethylene 5.4%, Carbon Monoxide 1.3%, Carbon Dioxide 7.4%, Hydrogen 4.6%, and Methane 81.3%. Table-4 sets forth characterization results for these polymers.

TABLE 4

| Example Number | NMR mole % Composition | GPC (Mn) | GPC (Mw) |
|---|---|---|---|
| 8 | | 860 | 1010 |
| 9 | E:30; sty:70; CO:trace | 2380 | 3450 |
| 10 | E:59; sty:41; CO:trace | 590 | 780 |

No double bonds indicating acetylene incorporation were observed in the NMR results, consistent with the MCS feed employed.

EXAMPLE 11

Carbon monoxide containing polymers using an MCS feed with a styrene cofeed was synthesized using free-radical polymerization as follows:

An inihibitor removal column removed any inhibitor in the styrene. The polymerization conditions were similar to those set forth in Example 3. A 300 ml autoclave reactor was charged with solvent n-hexane and t-butyl peroxypivalate initiator. One gram of purified styrene was introduced into the bomb so that it could be added with MCS feed. The reactor was sealed and purged with purified nitrogen. The reactor was pressurized to 200 psig with the MCS mixture (Ethylene 9.2%, Carbon Monoxide 21.5%, Carbon Dioxide 3.0%, Hydrogen 55.23%, Acetylene 8.01%, and Methane 3.06%). The temperature was raised to 66° C. while stirring, and was maintained for 24 hours. The reactor was allowed to cool to room temperature, and was then depressurized. The hexane was removed on rotary evaporator to obtain the product.

The IR spectrum of the product showed a characteristic carbonyl peak at 1715 cm-1 along with polystyrene peaks. The carbonyl peak in the IR shows that carbon monoxide has been incorporated into the product.

What is claimed is:

1. A method for producing a non-linear polymer from ethylene, carbon monoxide and at least one vinyl comonomer, comprising the step of reacting a feed under copolymerization conditions with at least one free radical polymerizable vinyl monomer, the feed comprising an olefinically unsaturated compound in an amount ranging from about 5 to about 40 mole %, carbon monoxide in an amount ranging from about 1 to about 40 mole %, hydrogen in an amount ranging from about 4 to about 55 mole %, carbon dioxide in an amount ranging from about 3 to about 10 mole %, methane in an amount ranging from about 4 to about 85 mole % and an acetylenically unsaturated compound in an amount ranging up to about 10 mole %, whereby a non-linear polymer is produced, and further wherein the copolymerization conditions range in temperature from about 50 to about 230° C., range in pressure from about 100 to about 30,000 psi and include a free radical initiator having an appropriate half-life.

2. The method of claim 1 wherein the copolymerization is conducted in the presence of a solvent selected from the group consisting of toluene, benzene, dioxane, pentane, heptane, hexane, propylene oxide, cyclohexane, and mixtures thereof.

3. The method of claim 1 wherein the free radical initiator is selected from the group consisting of ditertiary-butyl peroxide, 2,5-dimethyl-2,5-ditertiary-butyl-peroxyhexane, di-cumyl peroxide, tertiary-butyl hydroperoxide, tertiary-octyl hydroperoxide, cumene hydroperoxide, benzoyl peroxide, tertiary-butyl peroxypivalate, tertiary-butyl-perbenzoate, azo-bis-isobutyronitrile and mixtures thereof.

4. The method of claim 1 wherein the feed is derived from a hydrocarbon conversion process.

* * * * *